R. A. CAMPBELL.
TIRE PRESSURE GAGE.
APPLICATION FILED MAY 29, 1914.
1,153,026.
Patented Sept. 7, 1915.
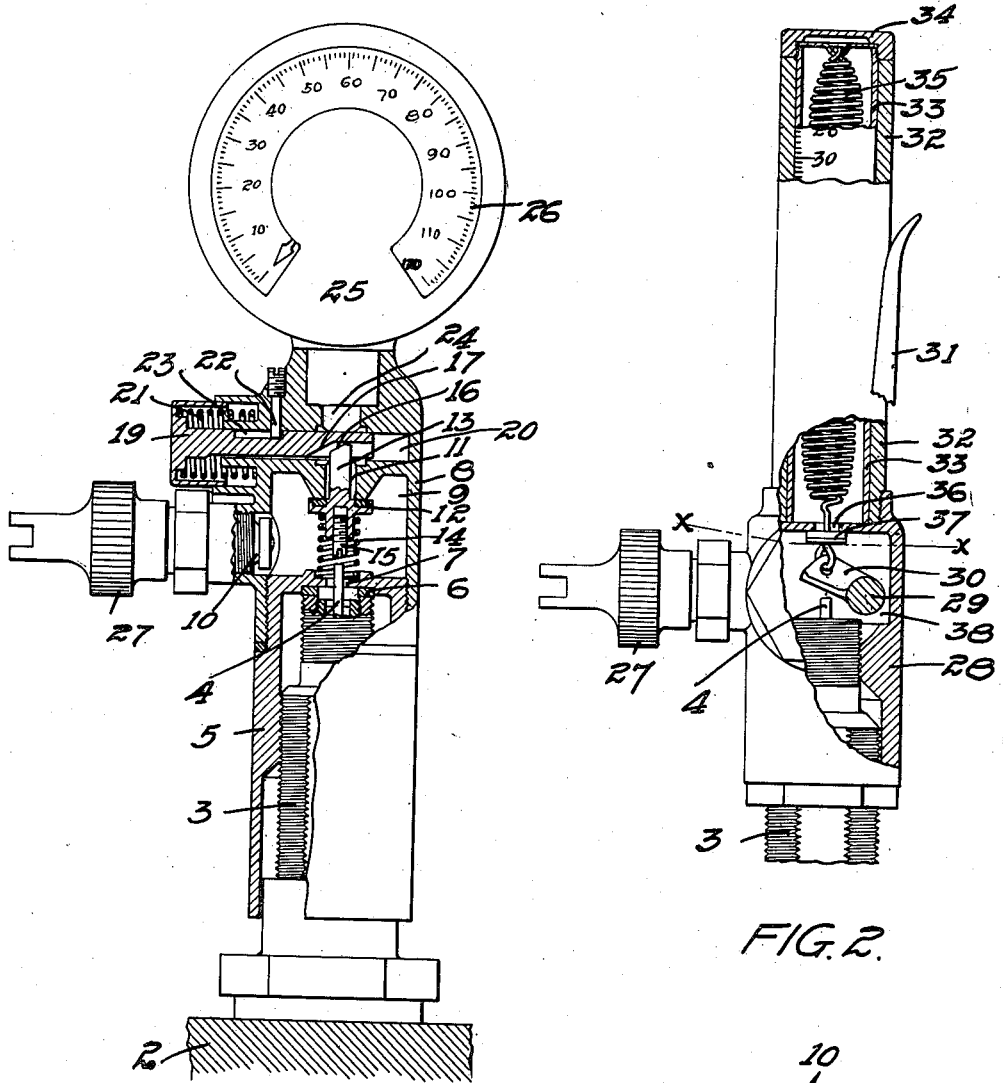
FIG. 1.
FIG. 2.
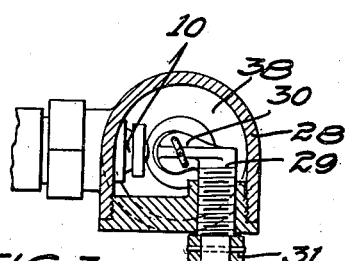
FIG. 3.
WITNESSES
INVENTOR
ROBERT A. CAMPBELL
BY
ATTORNEYS

UNITED STATES PATENT OFFICE.

ROBERT A. CAMPBELL, OF MINNEAPOLIS, MINNESOTA.

TIRE-PRESSURE GAGE.

1,153,026.

Specification of Letters Patent. Patented Sept. 7, 1915.

Application filed May 29, 1914. Serial No. 841,772.

*To all whom it may concern:*

Be it known that I, ROBERT A. CAMPBELL, citizen of the United States, resident of Minneapolis, county of Hennepin, State of Minnesota, have invented certain new and useful Improvements in Tire-Pressure Gages, of which the following is a specification.

The object of my invention is to provide an indicating device adapted for permanent attachment to a tire by means of which the driver of the car can easily and quickly ascertain the tire pressure without the necessity of applying a gage to each tire.

A further object is to provide a tire pressure gage comprising but few parts and hence economical of manufacture and not likely to get out of order.

The invention consists generally in various constructions and combinations, all as hereinafter described and particularly pointed out in the claims.

In the accompanying drawings forming part of this specification, Figure 1 is a view, partially in section, of a tire gage embodying my invention, Fig. 2 is a similar view of a modified construction, Fig. 3 is a sectional view on the line $x$—$x$ of Fig. 2.

In the drawing, 2 represents a portion of a wheel rim and 3 is a valve nipple having a valve 4 therein. The nipple 3 is exteriorly threaded to receive an interiorly threaded sleeve 5 that is seated upon a gasket 6 on the end of the nipple 3. The sleeve 5 has a port 7 therein through which the stem of the valve 4 projects. A casing 8 is mounted on the sleeve 5 and is provided with a chamber 9 therein, communicating with the port 7 and also with an intake valve 10 through which the air pressure is admitted to the chamber. The wall of the chamber 9 opposite the port 7 is provided with a passage 11. A valve 12 is arranged to close the passage 11 and has a stem 13 projecting through said passage and a spring 14 normally holds the valve in its closed position. A stud 15 is mounted in the valve 12 concentric with the valve 4 in position to engage and open the valve 4, when the valve 12 is moved from its seat.

To unseat the valve 12, I prefer to provide a beveled surface 16 on the stem 13 in the path of a similar surface 17 provided on the stem of a push button 19, said stem sliding in a transverse socket 20 formed in the casing 8. A spring 21 normally holds the push button and its stem in their retracted position, and a stud 22, projecting into a slot 23 in the stem, operates as a guide therefor and also limits the movement of the stem in both directions. A passage 24 leads from the socket 20 to a gage 25 having a suitable dial 26 with an indicator hand arranged to move over the face of the dial and indicate the air pressure in pounds in the tire. This gage is of ordinary construction, and I have not thought it necessary to illustrate it in detail herein.

The device may be permanently mounted on the tire and when the driver of the car wishes to ascertain the pressure in the tire he will force the push button inwardly against the pressure of its spring, unseat the valve 12 sufficiently to open the air valve 4, whereupon the air will escape from the tire and flowing up through the chamber 9 to the gage, will indicate the air pressure in the tire. To inflate the tire, it is only necessary to remove the cap 27, attach an air supply to the valve 10 and allow any desired pressure to enter the tire.

In Fig. 2 I have shown a modified construction, which consists in providing a sleeve 28, interiorly threaded, to engage the threads of the valve nipple and having a rock shaft 29 mounted therein upon the inner end of which is an arm 30 in position to engage and open the valve 4 when the shaft is rocked to a predetermined point. The end of the shaft projects through the wall of the sleeve and is provided with an operating lever 31. Upon the sleeve 28 a second sleeve 32 is mounted and within the sleeve 32 is a sliding tube 33 graduated to indicate points of pressure and having a cap 34 at its outer end that is normally seated on the outer end of the sleeve 32. Within the tube 33 is a spring 35 connected at one end to the cap 34 and having its opposite end projecting through a port 36 in the end wall of the sleeve 28 and connected to the arm 30 to normally hold said arm in its raised position. The valve 37 is carried by the said end of the spring to bear on the wall of the sleeve 28 and normally close the port 36 against the passage of air. Between this port and the tire valve a chamber 38 is formed, with which the air supply valve communicates in the same manner as described with reference to the chamber 9 and to inflate the tire the air is admitted to this chamber and from thence passes through the valve to the tire. Whenever the operator desires to ascertain the degree of pressure in the tire, he may rock the shaft 29 by means of the lever 31, open the tire valve, admit air therefrom to the chamber 38 and the port 36, and sufficient pressure having entered the tube 33 to overcome the tension of the spring therein, the tube will be projected outwardly until the graduations thereon are visible to indicate the number of pounds of pressure in the tire.

I claim as my invention:

1. The combination, with a tire valve, of a casing having an indicating device, a member in said casing to open communication between the tire and said indicating device, means exterior to said casing for operating said member, and a spring connected with said indicating device and said member in their retracted positions.

2. The combination, with a tire valve, of a casing mounted thereon, an indicating device mounted on said casing, a member in said casing to open communication between the tire and said indicating device, a lever exterior to said casing for operating said member, and a spring connected with said indicating device and with said member and normally holding said indicating device and said member in their retracted positions.

In witness whereof, I have hereunto set my hand this 22d day of May, 1914.

ROBERT A. CAMPBELL.

Witnesses:
GENEVIEVE E. SORENSEN,
EDWARD A. PAUL.